Dec. 19, 1933. C. W. P. HEYLANDT Re. 19,031

PROCESS AND APPARATUS FOR THE LIQUEFACTION OF GASES

Original Filed Nov. 29, 1927

INVENTOR
Christian Wilhelm Paul Heylandt
BY
Watson, Bristol, Johnson & Leavenworth
ATTORNEYS Reissued Dec. 19, 1933

Re. 19,031

UNITED STATES PATENT OFFICE 19,031

PROCESS AND APPARATUS FOR THE LIQUEFACTION OF GASES

Christian Wilhelm Paul Heylandt, Berlin-Britz, Germany, assignor to Fluga Aktien-Gesellschaft, St. Moritz, Switzerland Original No. 1,777,040, dated September 30, 1930, Serial No. 236,401, November 29, 1927, and in Germany December 29, 1926. Application for reissue September 29, 1932. Serial No. 635,424

11 Claims. (Cl. 62—1)

The present invention relates to a process and apparatus for the liquefaction of gases and has for its principal object to provide a process and apparatus for the recovery and conservation of gases vaporized when liquefied gas is stored, transferred or transported.

More specifically, it is an object to provide a process and apparatus for reliquefying gases vaporized when a liquefied gas of low boiling point is stored and handled in air liquefying and separating plants.

Another object is to provide a process and apparatus for recovering gas which is at too low a pressure for the desired purposes by utilizing other gas at a substantially higher pressure to increase to a desired value the pressure of the gas to be recovered.

Another object is to provide a process and means for eliminating the use of large low pressure gasometers for recovering evaporation products.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the application of which will be indicated in the claims.

For a fuller understanding of the nature and objects of the invention reference should be had to the following detailed description taken in connection with the accompanying drawing, in which.

In the operation of air-liquefying plants, as for example those for obtaining pure liquid oxygen, it has been customary heretofore to draw the liquid from the air-liquefying apparatus into large storage containers and then to transfer the liquid from the latter into other containers to be used as desired. To avoid, as far as practical, the loss of gas to the atmosphere, such gases as are vaporized from the liquefied gas when it is stored in containers at relatively low pressure and during the transferal of liquefied gas from one container to another, were recovered by collecting them in large low pressure gasometers from which they were transferred and compressed into suitable containers by means of compressors. The present invention avoids this inconvenient, undesirable and expensive manner of handling the gases, by providing a procedure whereby all gases which might otherwise escape are carried back by suitable means to the liquefying apparatus to be reliquefied. In the preferred type of gas liquefying apparatus, the refrigerating capacity of the apparatus is sufficiently increased that the gas on being so returned will be liquefied. This can be effected by increasing the pressure, for example, from a normal 200 atmospheres to 250 atmospheres, which causes the refrigerating capacity, especially of an expansion means, to be greatly increased, so that the final temperature is decreased from −130° C. to −170° C. In this manner the complete re-liquefaction of all gases returned to the column condenser is effected and it is unnecessary to store such gas material in the gas phase at the producing plant.

Figure 1:
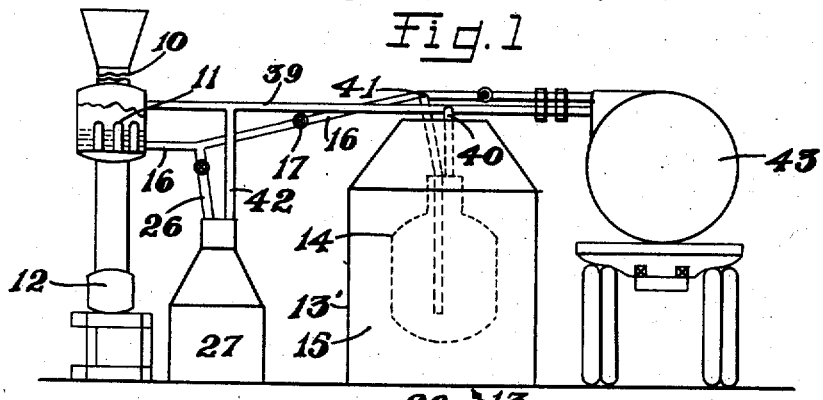
Fig. 1 is a diagrammatic elevational view of means and exemplary apparatus adapted for practicing the invention.

Referring now to Fig. 1, 10 illustrates generally an air liquefying and separating apparatus comprising a column of a type which has a condenser portion 11 and an evaporator portion 12. A liquefied gas storage container 13 is shown associated with the column. This container has an outer jacket 13′ and an inner vessel 14 (indicated in broken lines) for holding the liquefied gas, the space 15 between the inner vessel and the jacket being of a heat insulating character. A container for storing and vaporizing liquefied gas of a type known as a cold converter is also preferably employed and is shown generally at 27. A low pressure container 43, adapted for storing and transporting liquefied gas, and of a character such that evaporation products may arise therein, is shown operatively connected to the liquefying apparatus.

In the apparatus here shown, conduit 16 provided with a valve 17, serves as a common connection whereby each of the containers above described is connected to the liquefying apparatus 10. The conduit 16 is used for conducting liquefied gas out of the column 10 to each of the containers and for transferring liquefied gas from one container to another. To this end conduit 16 is detachably coupled to the liquid inlet of transport container 43, and a valved connection 26 leads liquefied gas from conduit 16 into container 27, while connection 41 between conduit 16 and storage container 13 conducts liquefied gas in or out of the storage container. Gas resulting from the evaporation of liquefied gas in each of the containers while said liquid is either in storage or in the process of filling and transferring liquid from one to the other is conducted back to the liquefying apparatus 10 by means of conduit 39, which is also detachably coupled to the vapor outlet of transport container 43. Conduits 40 and 42 connect the storage vessel 14 and the container 27, respectively, to the conduit 39 for the purpose of conducting the vapors from the containers to a point in the column 10 above the liquid level in the condenser portion 11.

It will be seen that the evaporation products resulting from the various operations in handling and storing liquefied gases are transferred to the liquefying column 10 to be re-liquefied and that therefore substantially none will be lost to the atmosphere and that the use of a gasometer for collecting such gases is not required.

Figure 2:
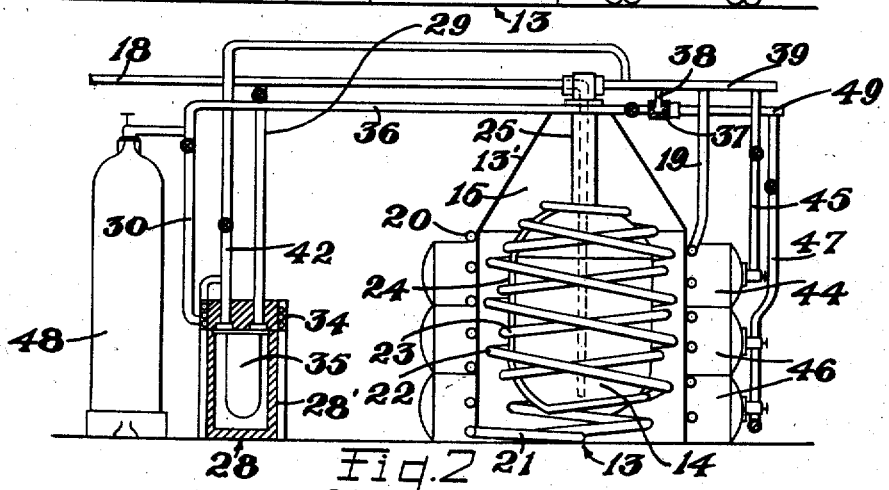
Figs. 2 and 3 are views partly in elevation and partly in section of modified forms of the apparatus.

In Fig. 2 is shown the storage container 13 with an outer envelope 13′ sectioned to show the inner vessel 14 and insulating space 15. A liquid conduit 18 leading from the liquid holding portion of vessel 14 passes up through neck 25 of vessel 14 and leads out to the liquefying column which is not shown in this figure. A gas discharge conduit 19 communicates with a coil 20 surrounding the casing 13. The lower end of coil 20 by a connection 21 communicates with the lower end of a coil 22 which surrounds the vessel 14 substantially spaced from its walls. The upper end of coil 22 communicates with a coil 23 that is coiled about vessel 14 relatively close to its wall. The lower end of coil 23 is in communication with the gas space of vessel 14 by means of a conduit 24.

A vaporizing container of a type known as a warm converter is shown generally at 28. This container comprises a relatively heavy walled outer vessel 28′ within which is suspended an inner vessel 35 for holding liquefied gas. Liquefied gas is conducted into vessel 35 by means of a valved conduit 29 which communicates with the liquid supply conduit 18. Gas which is vaporized in the warm container 28 normally is conducted out through conduit 42 and the branch which communicates with the coiled conduit 34 around the upper portion of the warm container 28, from which it is conducted by valved conduit 30 into a gas receiver 48, where gas is stored at a relatively high pressure. The conduit 42, which is provided with a valve in the portion beyond the branch to coil 34, conducts gas when desired to the low pressure gas conduit 39. Conduit 39 conducts gas when desired to the liquefying column which is not shown in this figure. The conduit 19 conducts gas from the coils 20, 22 and 23 of the storage container 14 into conduit 39. A receiver 44 of fixed capacity is also in communication with conduit 39 by means of valved conduit 45. The receiver 44 is used to store, when desired, gas which is collected in conduit 39 and to deliver the gas to conduit 39 again when desired.

A conduit 36 branches from conduit 30 and leads to a means for utilizing the available energy of a gas at relatvely high pressure for drawing other gas from a source at relatively low pressure and compressing it to a desired pressure which is here shown in the form of an injector 37. The valved conduit 36 conducts gas from the relatively high pressure source at 28 and 48 to the high pressure inlet of injector 37. A connection 38 conducts gas from the conduit 39 into the suction chamber of injector 37. The gases discharged by the injector 37 are conducted by a conduit 49 to a gas consuming device or to a gas liquefying apparatus or to the storage receivers 46. A valved conduit 47 connects the receivers 46 to conduit 49, so that gas may be conducted into or out of the receivers, as desired.

Figure 3:
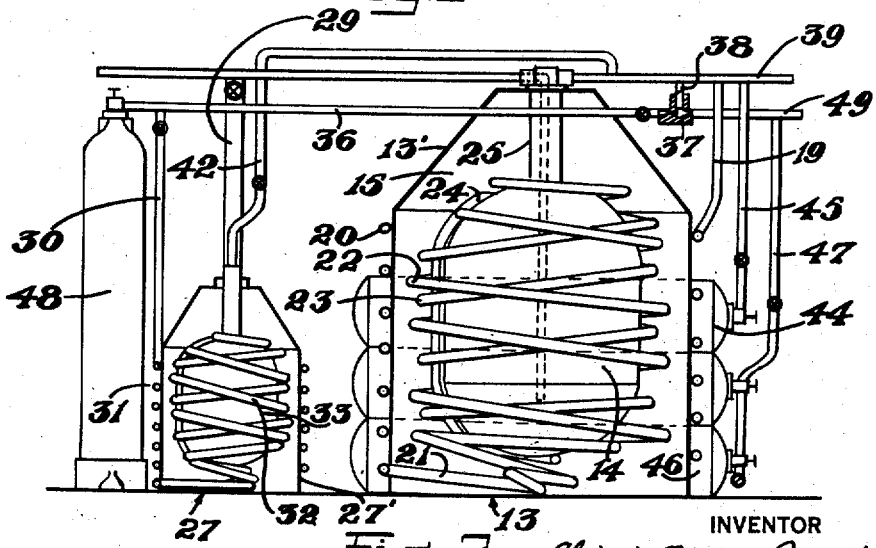

Fig. 3 illustrates apparatus similar to that shown in Fig. 2, except that instead of employing a container of the type shown at 28, there is substituted the type shown at 27 in Fig. 1. The container shown comprises an external jacket 27′ within which is disposed a liquefied gas holding vessel 33. A heat insulating space substantially surrounds the vessel 33 to insulate the same against the uncontrolled influx of heat. A liquid discharge conduit 32 is coiled around the vessel 33 and joins the lower end of an evaporating coil 31, which is wound around the outer jacket 27′. The valved conduit 30 is in communication with the upper end of coil 31. Liquefied gas is introduced into the cold converter 27 by means of conduit 29 and gas is conducted when desired out of cold converter 27 by means of valved conduit 42.

In the form of apparatus shown in Fig. 2, a supply body of relatively high pressure gas is generated by filling the inner vessel 35 of the container 28 with liquefied gas from conduit 18 through conduit 29, the liquid being conducted from either the liquefying apparatus not shown or from the body of liquid stored within storage container 13, and the displaced gas being conducted from the container 28 to conduit 39 through conduit 42. When the inner vessel 35 is filled, the valves in conduits 29 and 42 are closed, and the valve in conduit 30 opened, and heat is permitted to reach the liquefied gas in vessel 35 through the walls of the container 28, so that the liquid is vaporized at a relatively high rate and gas is conducted into and stored in receiver 48 at a relatively high pressure for use when desired.

In the form of vaporizing container shown in Fig. 3, the supply body of relatively high pressure gas is obtained in a similar manner by filling the container 33 with liquefied gas from the conduit 18 through conduit 29, permitting the displaced and vaporized gases to escape to conduit 39 through conduit 42. When it is desired to provide a supply of gas at high pressure, the valves in conduits 29 and 42 are closed and the valve in conduit 30 opened and liquefied gas is withdrawn from vessel 33 into the coil 32 and the evaporating coil 31, where it is vaporized and converted into gas at the desired pressure which is stored in receiver 48.

The storage container 13, shown in both Figs. 2 and 3, cannot, with present commercially available means, be insulated sufficiently perfectly to avoid entirely the flow of heat, though at a relatively low rate, into the body of liquefied gas stored therein, so that a small amount of vaporization of the liquid occurs. These vapors are preferably conducted through the coils surrounding the inner vessel 14 and then are conducted to conduit 39 through conduit 19. The gases which are collected in conduit 39 are either led to the liquefying apparatus not shown or are led into receiver 44 through conduit 45, as desired. When it is desired to increase the pressure of such gases, the injector 37 is operated. To this end, gas at high pressure is admitted through conduit 36 to injector 37 where the energy of the high pressure gas is converted into kinetic energy which is transferred to gas that enters through connection 38 from conduit 39.

The velocity energy of the combined gases is transformed into energy of pressure, so that the gas delivered to conduit 49 is of a desired intermediate pressure. The gas at intermediate pressure is conducted into and stored in receivers 46 through conduit 47, from which it is discharged when desired to consuming apparatus not shown. When the gas collected in conduit 39 is of too low a pressure to flow to the liquefying apparatus, the injector 37 may be operated to raise the pressure to the desired value, so that the gas may be conducted to the liquefying apparatus through conduit 49.

It will be seen that by the use of the injector 37, gases which are at too low a pressure for desired purposes may be drawn out of any of the containers and forced into containers 46 and to consuming apparatus, or to the liquefying apparatus.

From the foregoing, it will be seen that the connection of a container, such as a container for withdrawal products, a stationary or transportable container for liquefied gas, with a gas liquefying apparatus by means of conduit connections, whereby the products arising by evaporation of the liquid handled may be returned, is an essential characteristic of the present invention. By such direct return, it will also be seen, that use of storage gasometers and of compressors, as heretofore commonly employed, is done away with together with the accompanying losses, whereby the overall efficiencies of production plants are materially increased.

Since certain changes in carrying out the above process and in the constructions set forth, which embody the invention, may be made without departing from its scope, it is intended that all matter contained in the above description or shown in the accompanying drawing shall be interpreted as illustrative and not in a limiting sense.

Having described my invention, what I claim as new and desire to secure by Letters Patent, is:

1. The method of conserving evaporation products arising from liquid oxygen when held in storage containers and the like, which comprises returning said evaporation products from said container to an air liquefying and separating apparatus, and liquefying the returned products by increasing the refrigerating capacity of said apparatus.

2. The method of conserving evaporation products arising from liquid oxygen when held in storage containers and the like, which comprises returning said evaporation products from said container to an air liquefying and separating apparatus, and liquefying the returned products in said apparatus by increasing the pressure from about 200 atmospheres to 250 and decreasing the temperature from about −130° C. to about −170° C.

3. The method of conserving evaporation products arising from liquefied gases held in containers which comprises returning said evaporation products from a container to a gas liquefying apparatus, and liquefying the returned products by utilizing within said apparatus the pressure resulting from the temporary storage within said container of said products of evaporation.

4. The method of conserving evaporation products arising from liquefied gases held in containers which comprises returning said evaporation products to a gas liquefying apparatus, utilizing the available energy of the returned products for the liquefaction of gas, and increasing the pressure to a value desired for consumption.

5. The process of liquefying gases evaporated within closed pressure tanks, which consists in introducing said gases into a distributing system operating under different degrees of pressure, and utilizing the increased pressure resulting from the transition from the liquid to the gaseous state for raising the tension of low-pressure gases and vice versa.

6. Apparatus for recovering gas vaporized from a low boiling point liquefied gas comprising a gas liquefying and separating apparatus including a refrigerating portion, liquefied gas storage means associated therewith, a liquefied gas container, means for supplying gas under pressure to cool said refrigerating portion by gas expansion, and conduit connections for transferring liquefied gas and for conducting gas vaporized from liquefied gas into the refrigerating portion of said apparatus.

7. Apparatus for recovering gas vaporized from a low boiling point liquefied gas comprising a gas liquefying and separating apparatus including a refrigerating means, a filling container communicating therewith, a storage container for liquefied gas in communication with said filling container and apparatus, a transportable container also in communication with said filling container and apparatus, and means for introducing gas under relatively high pressure to said refrigerating means to produce a refrigerating effect therein including vapor return connections leading from said containers.

8. Apparatus for recovering gas vaporized from liquefied gas comprising a gas liquefying apparatus, a liquefied gas container and a refill device in communication with said apparatus, a supply container connected with said liquefied gas container, means for utilizing in said refill device the pressure generated in said supply container, and means actuated by said pressure for increasing the gas pressure in portions of said connected apparatus and reducing the pressure in the remaining portions.

9. Apparatus for recovering gas vaporized from liquefied gas comprising a gas liquefying apparatus, a low pressure container and a high pressure container connected to communicate with said apparatus, additional containers of the pressure type connected with said low pressure container, the connections being such that the evaporation products arising from said low pressure container are operative to generate high pressure in said high pressure container, and injectors disposed in said connections and arranged to be operated by the high pressure generated in said additional containers to produce increased pressure in certain of said containers and reducing the pressure in the remaining containers.

10. Apparatus for liquefying evaporation products resulting from the operation of liquefied-gas containers, comprising a gas-supplying system adapted to operate under different pressures, gasifiers, pipe lines communicating with said system and gasifiers, injectors disposed in said pipe lines, pressure tanks connected with the high and low pressure sides of said gasifiers, and means for causing the high-pressure gases from the gasifiers to actuate said injectors thereby to reduce the pressure in the low-pressure tanks and increase the pressure in the high-pressure tanks.

11. Apparatus for liquefying evaporation products resulting from the operation of liquefied-gas containers, comprising a gas-supplying system adapted to operate under different pressures, gasifiers, pipe lines communicating with said system and gasifiers, injectors disposed in said pipe lines, pressure tanks connected with the high and low pressure sides of said gasifiers, means for causing the high-pressure gases from the gasifiers to actuate said injectors thereby to reduce the pressure in the low-pressure tanks and increase the pressure in the high-pressure tanks, and means for storing up in said low-pressure tanks the gases generated in the gasifiers by natural evaporation.

CHRISTIAN WILHELM PAUL HEYLANDT.